United States Patent [19]

McDowell

[11] 4,368,902
[45] Jan. 18, 1983

[54] COMBINATION CURTAIN AND RESTRAINT SYSTEM FOR A VEHICLE BUNK

[75] Inventor: Philip R. McDowell, Tracy, Calif.

[73] Assignee: Paccar Inc., Bellevue, Wash.

[21] Appl. No.: 209,993

[22] Filed: Nov. 24, 1980

[51] Int. Cl.³ .............................................. B62D 33/04
[52] U.S. Cl. ................................. 280/749; 296/24 R; 296/190; 410/118
[58] Field of Search ........... 52/DIG. 13; 160/DIG. 2; 244/118.1, 121; 280/748, 749; 296/24 R, 35.2, 138, 141, 190; 410/96, 97, 117, 118, 127, 129, 156

[56] References Cited

U.S. PATENT DOCUMENTS

| | | | |
|---|---|---|---|
| 1,066,269 | 7/1913 | Goodfellow | 296/141 |
| 1,110,857 | 9/1914 | Applas | 296/141 |
| 2,455,237 | 11/1948 | Davis | 410/97 |
| 3,294,034 | 12/1966 | Bodenheimer et al. | 244/118 R X |
| 3,525,535 | 8/1970 | Kobori | 296/24 R |
| 3,663,037 | 5/1972 | Wohn-Machowski | 280/749 |
| 3,753,458 | 8/1973 | Lazarek | 160/DIG. 2 X |
| 4,043,582 | 8/1977 | Lyter | 296/24 R |
| 4,137,683 | 2/1979 | Pfeiffer | 52/506 |
| 4,168,667 | 9/1979 | Loomis | 410/118 |

Primary Examiner—Joseph F. Peters, Jr.
Assistant Examiner—Michael Mar

Attorney, Agent, or Firm—Owen, Wickersham & Erickson

[57] ABSTRACT

A restraint system for a vehicle bunk is combined with a privacy and light-excluding curtain to provide a system which is easily engaged and disengaged from the inside of the bunk. The bottom edge of the upwardly openable center curtain panel is closed only with securement of the bottom ends of restraint straps, so that the restraint system is used whenever the curtain is fully closed. The lower ends of the restraint straps are simply slipped through loops at the inside surface of the curtain panel, just above the latching devices at the ends of the restraint straps, so that connection of the restraint to the curtain is easily and efficiently accomplished, and separation of the two is easily made when desired. Depending storage straps are provided for storing the curtain, with or without the restraint straps, in raised, rolled-up condition. The entire curtain and restraint system, including side panels, is removably secureable to the sleeper bunk by means of quickly fastenable pin and hole structure and hook and looped fabric type fasteners. The system makes use of the restraint straps convenient and nearly mandatory whenever the curtain is to be closed, yet enables the restraint portion of the system to be used independently of the curtain, with the openable curtain panel in the stored position.

16 Claims, 8 Drawing Figures

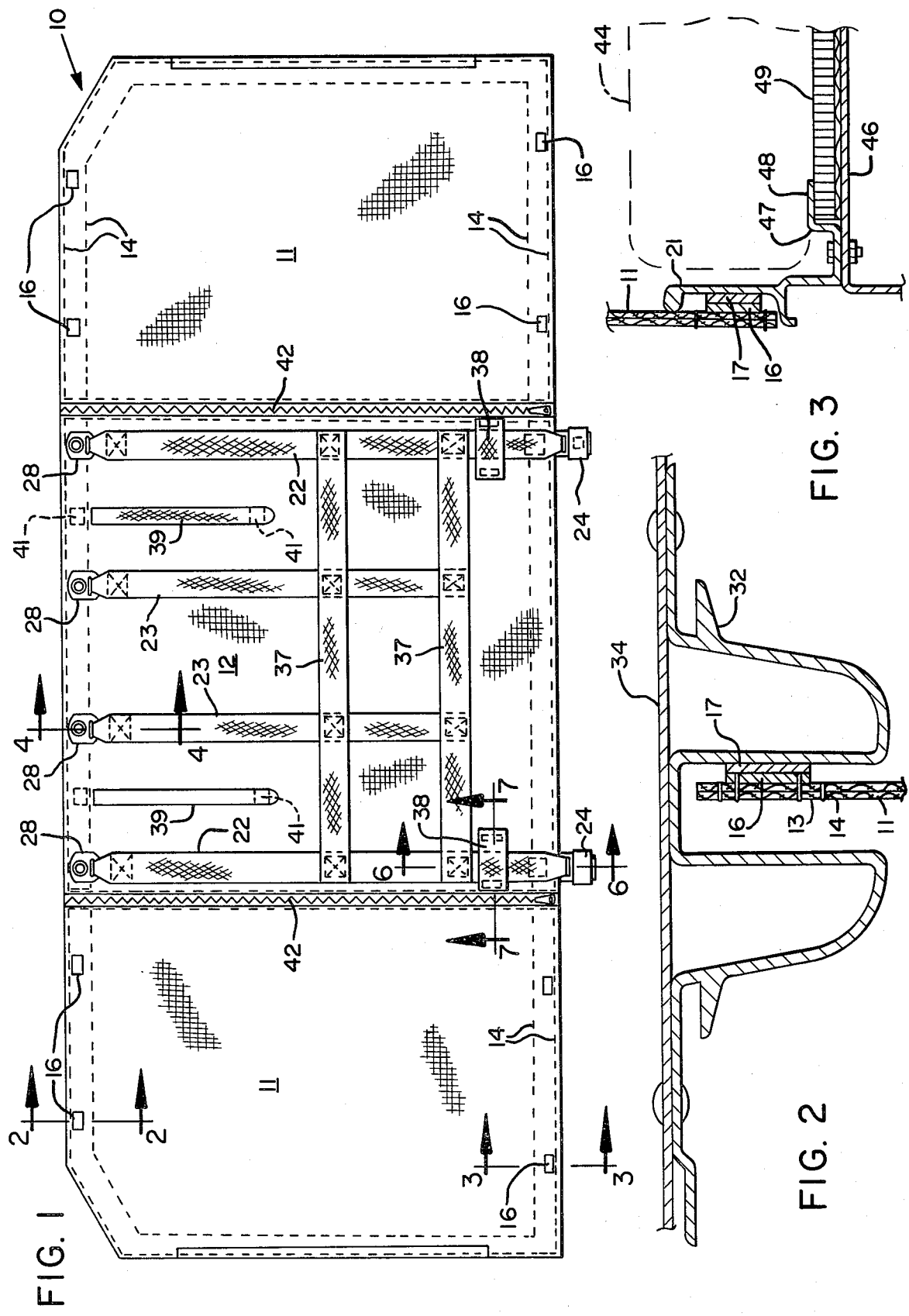

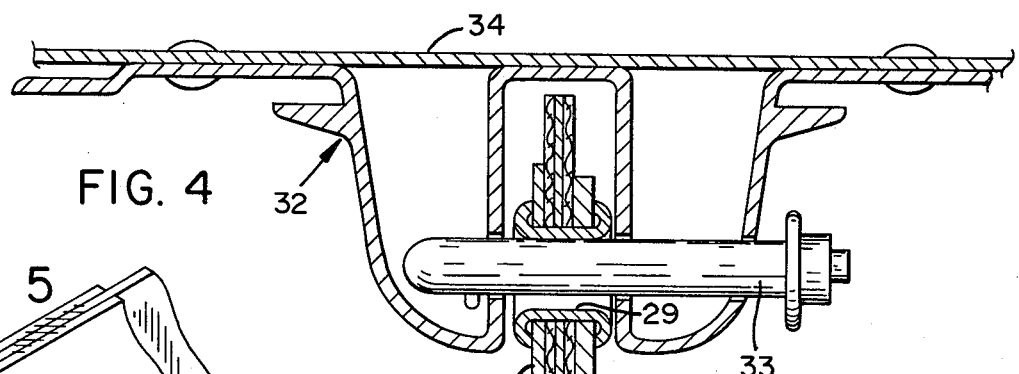
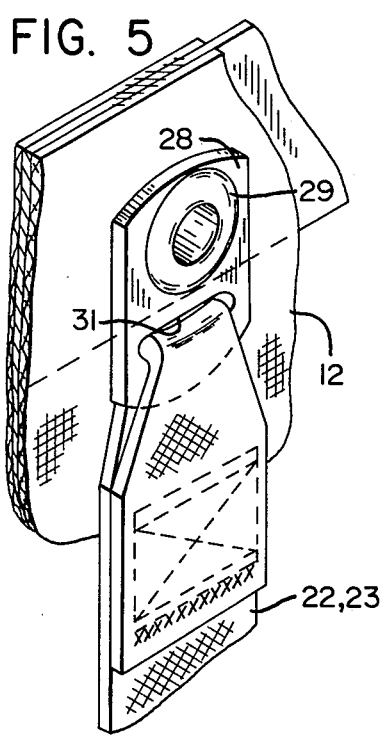
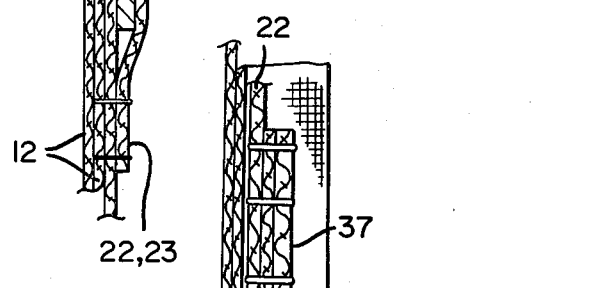
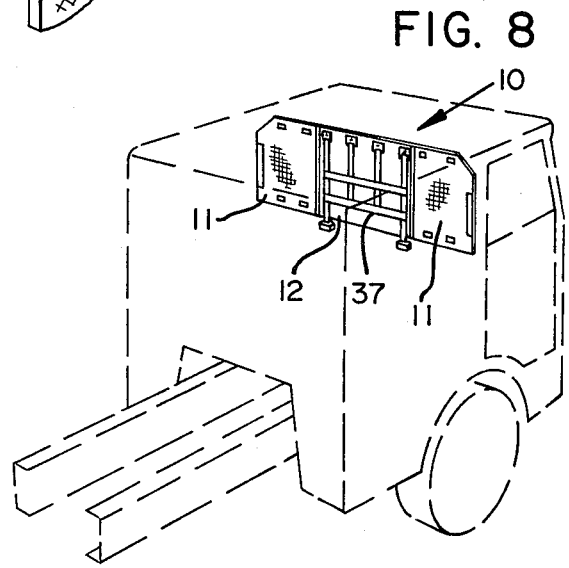
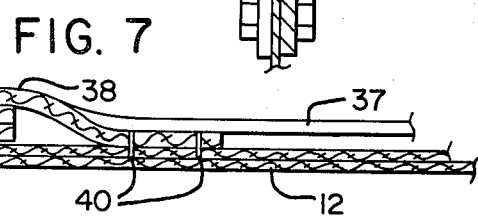
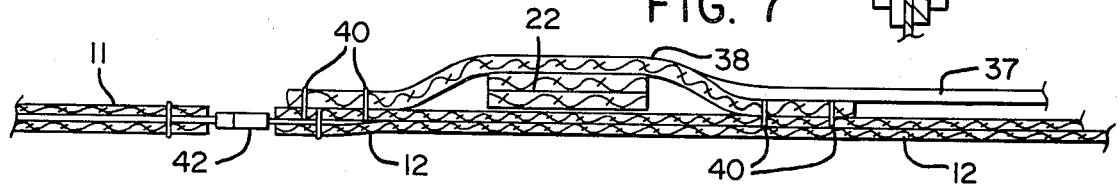

COMBINATION CURTAIN AND RESTRAINT SYSTEM FOR A VEHICLE BUNK

BACKGROUND OF THE INVENTION

The invention relates to vehicle sleeper bunks, and more particularly to a combined restraint and curtain system for vehicle sleeper bunks.

Previously, sleeper bunks for truck cabs, positioned behind the driver compartment, have had a curtain for privacy and light exclusion and a separate restraint system adjacent to the curtain for preventing the occupant's being thrown forward out of the sleeping compartment when strong inertial forces occur, as in an accident. The curtain itself was usually snapped into place around the forward periphery of the sleeper bunk, and this was a slow and awkward process. Then the restraint was installed by threading straps through hardware on the cab structure, also slow and very awkward. The curtain and restraint of these prior systems did not work well together, and the occupant had a difficult time entering and exiting the sleeping area when both the curtain and the restraint were installed. Also, when not in use, the restraint device did not store well in these prior systems. As a result of much of this, the occupant of the sleeper bunk seldom used the restraint device, and the purpose of the restraint was defeated.

None of the prior art of which the applicant is aware shows a bunk curtain and restraint combination having the advantageous features of the present invention described below. Lyter U.S. Pat. No. 4,043,582 shows a restraining net but without any strap in conjunction with the net. Applas U.S. Pat. No. 1,110,857 disclosed a vehicle curtain in sections, with the sections storable by rolling them up, as was typical of some of the prior art. Pfeiffer U.S. Pat. No. 4,137,683 shows zippers adjoining adjacent curtain sections. Lazarek U.S. Pat. No. 3,753,458 shows the use of hook and looped fabric type fasteners, known under the trademark Velcro, in a vehicle curtain.

No suggestion of the combined sleeper bunk curtain and restraint system of the invention has been found in the prior art.

SUMMARY OF THE INVENTION

According to the present invention a sleeper bunk curtain and restraint system are combined to result in a system which enables easy and convenient ingress and egress to the sleeping area, provides for easy storage of both the curtain and the restraint, enables the use of the restraint separate from the curtain, and induces the occupant of the sleeper bunk to use the restraint more regularly, since he must use the restraint straps to close the curtain. The combination curtain and restraint system for a vehicle bunk includes a flexible, openable curtain panel suspended from its top and there secured to structure connected to the vehicle, with restraint straps extending down from the top of the curtain panel, secured to the vehicle-connected structure and positioned adjacent to the inside of the curtain panel but hanging independently therefrom. Means are provided for connecting the restraint straps to the inside of the curtain panel near its bottom when the curtain panel is to be closed and secured. There are fastening means at the lower ends of the straps, for securing them to the structure connected to the vehicle. By this arrangement, the lower end of the curtain panel is secured by connection of the restraint straps to the inside of the curtain panel and by securing of the fastening means at the lower ends of the straps.

There are at least three and preferably four vertically-depending restraint straps, connected at their upper ends to brackets which are in turn secured removably to pins affixed to the cab structure. The openable curtain panel is supported by the brackets. At the lower ends of at least two of the restraint straps, preferably the outer two, are seat-belt type buckles, which engage with structure at the floor of the sleeper compartment. Transverse restraint straps are preferably included, secured to each of the vertical straps, forming a restraint web which hange adjacent to the openable curtain panel, on the bunk compartment side.

To close the openable curtain panel at its bottom, the occupant of the sleeper bunk must insert the lower ends of the two straps having the buckles through loops formed on the inside surface of the curtain panel, then secure the buckles. Thus, in order to have the curtain panel fully closed, the occupant must engage the safety restraint system, and it is therefore used much more frequently than was the case with prior art systems.

Nonetheless, the occupant may use the restraint system alone, without the openable curtain panel, simply by rolling up the panel and retaining it in a raised position with a pair of support straps having quick releasable fasteners at their ends. When desired, the curtain panel and restraint device can be rolled up togehter and stored in the same manner, providing an additional convenience not found in the prior art.

The entire curtain and restraint combination is attached to the front of the sleeper bunk by means of easily attachable and detachable connections. The curtain may be in three panels, with only the center panel conveninetly openable, and at the top of the openable panel the curtain is preferably connected by means of the brackets as described above. The side panels may be connected to the cab structure by hook and looped fabric fasteners, such as "Velcro". To secure the combined system to the bunk, the brackets on the center panel are positioned in an extrusion overhead and quick release pins are slipped through openings in the brackets. This holds the curtain and restraint straps securely in place, resisting any pulling movement by the straps. The side panels are then quickly attached by means of the "Velcro" or similar fasteners, and the system is in place for use. Zippers may be included between the openable center curtain panel and the side panels, for use in closure of the center panel.

Accordingly, it is among the objects of the invention to provide a combined sleeper bunk curtain and restraint system which is easily installed in and removed from a vehicle, is conveniently used, and combines the restraint and curtain in such a way that the restraint must be used by the occupant of the sleeper bunk in order to fully close the curtain, encouraging use of the restraint, but with use of the restraint independent from the curtain also facilitated.

These and other objects, advantages and features of the invention will be apparent from the following description of a preferred embodiment, in conjunction with the appended drawings.

DESCRIPTION OF THE DRAWINGS

FIG. 1 is an elevational view of a sleeper bunk curtain and restraint combination according to the invention, shown as it would be installed in a vehicle, looking from the bunk forwardly.

FIG. 2 is a sectional view taken along the line 2—2 of FIG. 1, showing the connection of the curtain to the vehicle structure.

FIG. 3 is a sectional view taken along the line 3—3 of FIG. 1, again showing the connection of the curtain to the vehicle structure and also indicating the location of a bed or mat for the occupant of the sleeper bunk.

FIG. 4 is a sectional view taken along the line 4—4 of FIG. 1, showing the connection of the curtain and restraint system at the top of a center, openable curtain panel, with a supporting bracket at the top of each restraint strap, also secured to the curtain by a grommet through the bracket, and showing the assembly supported by a pin in an overhead extrusion.

FIG. 5 is a perspective view of the strap and curtain attachment structure shown in FIG. 4.

FIG. 6 is a sectional view taken along the line 6—6 of FIG. 1, showing the connection of buckles in the restraint system, at the lower end of the restraint straps, and also indicating the connection of the restraint straps to the inside of the curtain panel.

FIG. 7 is a sectional view taken along the line 7—7 of FIG. 1, again indicating the manner in which the restraint straps are connected to the inside of the openable curtain panel, when desired.

FIG. 8 is a partially broken-away perspective view showing a truck cab with a sleeper bunk which may employ the curtain and restraint system of the invention.

DESCRIPTION OF A PREFERRED EMBODIMENT

In the drawings, FIG. 1 shows a combined sleeper bunk curtain and restraint system 10 essentially as it would be seen as installed, from the inside of the sleeper bunk, except that the periphery of the system is indicated, and part of this would be hidden from view as installed. The approximate position of the curtain and restraint system 10 in a truck cab is indicated in FIG. 8.

The curtain preferably includes a pair of side curtain panels 11 and an openable center curtain panel 12. The curtain panels may be of vinyl, fabric, or other suitable material. At the periphery of the three curtain panels, the material preferably is doubled over in an overlap 13 and stitched in some suitable manner at 14, as indicated. This provides required reinforcement at the periphery. Connection of the curtain panels to the vehicle structure may be by a convenient, easily attached and releasable system such as hook and looped fabric type systems, such as those known under the trademark "Velcro". Thus, loop fasteners 16 may be affixed to the inside edges of the side panels 11, as shown, with the hook fastener patches 17 positioned accordingly on vehicle structure at the periphery of the bunk (see FIG. 2). The remaining fasteners 16, as illustrated in FIGS. 2 and 3, may mate with corresponding fasteners 17 facing forwardly from vehicle structure such as an extrusion 32 as indicated in FIG. 2.

For the middle, openable curtain panel 12, the connection to the vehicle structure may be somewhat different. In the combined system of the invention, the curtain panel 12 preferably is supported by the same arrangement that supports a plurality of generally vertically depending restraint straps 22 and 23. As shown in FIG. 1, the outermost restraint straps extend from adjacent the top of the openable curtain panel 12 to the buckles, preferably seat-belt type fasteners 24, at their lower ends where they are secured to receiving brackets 26 (see FIG. 6) securely affixed to the structure of the vehicle, as at 27. These outer restraint straps 22 are therefore designed to accept most of the force imparted to the restraint system if the bunk occupant is thrown forward in inertial movement.

At the top of each restraint strap 22 there is a bracket 28 (see also FIGS. 4 and 5), preferably of metal, for supporting both the curtain panel 12 and the restraint strap. FIGS. 4 and 5 show a preferred arrangement by which the curtain panel 12 and straps 22 and 23 may be connected to the bracket 28, and the arrangement for connection of the bracket to vehicle structure. The overlapped portion 13 at the upper edge of the curtain panel 12 is secured to the bracket 28 preferably by a grommet 29 passing through openings in the bracket and curtain panel, so that the panel is supported by the bracket. A washer 30 may be included in this assembly, as indicated.

The bracket 28 includes a slotted opening 31 through which the straps 22, 23 pass as shown, with the strap ends 22a, 23a lapped over and stiched as indicated.

The straps and curtain panel are supported on an extrusion 32 which acts as a frame, being secured to other vehicle structure. Quick-release pins 33 are passed through the extrusion and through the grommets 29 as illustrated in FIG. 4.

At least two restraint straps 22, depending vertically along the inside surface of the openable curtain panel 12 are provided, as shown. Preferably one, two or more additional vertical restraint straps 23 are also included, between the outer positioned straps 22. The vertical straps 22 and 23 may be interconnected by transverse restraint straps 37, with at least one provided near the bottom of the straps 22, 23 as indicated, and preferably an additional, upper transverse strap included. This forms a web-like restraint strap structure which is very strong and resistant to inertial forces when the fasteners 24, i.e. the buckles, are engaged.

As outlined above, one problem with previous sleeper bunk curtain and restraint systems was that the restraint device tended to be in the way, caused inconvenience to the user of the sleeper bunk, and often was not used. With the arrangement of the present invention, the occupant of the bunk is induced to use the restraint system whenever he closes the openable curtain panel 12. In order to close the bottom of the curtain panel 12, the occupant must be sure that the lower end of each restraint strap 22 is positioned through a loop formed by a band 38 of material secured to the inside face of the openable panel 12, as illustrated in FIG. 1 (see also FIGS. 6 and 7). The bottom edge of the curtain panel 12 is not held tightly closed without the securement of the restraining straps 22 and 23 to the panel. The insertion is easily made, and the buckles 24 slip through the loops 38 without any inconvenience to the user.

FIGS. 6 and 7 also illustrate the connection of the restraint straps 22 through the loops 38. In the sectional view of FIG. 6, the band 38 forming the loop is shown positioned just below the lower transverse restraint strap 37. In FIG. 7, a sectional view looking upwardly, the band 38 forming the loop is illustrated as stitched at stitch points 40 to the center curtain panel 12, with the doubled-over strap 22 positioned in the loop side panel 11.

As long as the restraint and curtain panel 12 are to be used together, they may be left in this joined configuration. However, sometimes the occupant will want to use the safety restraint without the curtain panel 12. In these cases, he simply slips the lower ends of the restraint straps 22 out of the loops 38 and rolls up and raises the openable curtain panel 12 to a position adjacent to the extrusion 32 at the top. A pair of storage straps 39, secured to the overlapped edge 13 at the top of the panel, are then brought up and attached with fasteners 41, preferably "Velcro", to hold the curtain panel 12 in a stored condition.

Similarly, when both the curtain panel 12 and restraint are to be stored, they may be rolled up togehter and secured in the stored position by the storage straps 39.

Some form of connection is desirable between the center curtain panel 12 and the side panels 11, and this connection may be by means of zippers 42 as shown in FIG. 1. The zippers preferably hold the panels together and close the gap between them, but do not alone securely close the bottom edge of the center panel 12, so that the connection of the restraint buckles 24 is still necessary.

FIG. 3 indicates in dashed lines a bed or mat 44 inside the sleeping area, supported by floor structure 46 or other horizontal support structure of the vehicle. The flange 21 extending up from the floor of plate 46 may act as an edging to help maintain the bed 44 in position, and also to separate it from the fasteners 16 and 17, buckles 24, etc., as shown in FIG. 6. As FIG. 3 indicates, a bottom portion 47 from which the flange 21 extends may have a raised lip 48 to lie over and form an edge strip on carpeting 49 on the floor of the bunk compartment.

The preferred embodiment described herein is intended to be purely illustrative, and not limiting of the scope of the invention. Other embodiments and variations will be apparent to those skilled in the art and may be made without departing from the essence and scope of the invention as defined in the following claims.

I claim:

1. A combination curtain and restraint system for a sleeping compartment associated with a truck cab, comprising:
   structural means associated with the cab for suspending the curtain and restraint system;
   a flexible, openable curtain panel suspended from its top and there secured to said structural means, the panel having an inside surface facing into the sleeping compartment;
   restraint straps extending down from the top of the curtain panel, secured to the structural means and positioned adjacent to the inside surface of the curtain panel but hanging independently therefrom and transverse straps attached to and extending between the restraint straps to form a web-like structure;
   means for selectively connecting the restraint straps to the inside of the curtain panel only near its bottom when the curtain panel is to be closed and secured, comprising band means forming loops on the inside surface of the curtain panel for insertion of the restraint straps therethrough; and
   fastening means for securing the lower ends of the straps to structure connected to the cab;
   whereby the lower end of the curtain panel is secured by connection of the restraint straps to the inside of the curtain panel near its bottom, and by securing of the fastening means at the lower end of the straps, and whereby an occupant of the sleeping compartment can conveniently secure the restraint straps, with or without the curtain panel, from inside the bunk.

2. The combination curtain and restraint system of claim 1, further including a pair of curtain side panels, one on each side of the openable curtain panel, each side panel having securing means for connection to the vehicle at top, bottom and an outer side, and including a pair of generally vertically running zippers, one between each side panel and the adjacent edge of the openable curtain panel, for closing the openable curtain panel.

3. The combination curtain and restraint system of claim 1, wherein the fastening means comprises snap-together buckle and tongue type fasteners, with the buckles affixed to the ends of the restraint straps.

4. The combination curtain and restraint system of claim 1, further including a pair of storage straps depending from the top of the curtain panel, adjacent to its inside surface, with releasable fastening means at the ends of the storage straps and corresponding fastening means near the upper ends of the storage straps, for storing the curtain panel, with or without the restraint straps, in raised, rolled-up condition.

5. The combination curtain and restraint system of claim 1, wherein a bracket is secured to the top of each restraint strap and also to the top of the curtain panel, and including means secured to upper vehicle structure for suspending the straps and curtain panel by the brackets.

6. The combination curtain and restraint system of claim 5, wherein the bracket includes an opening with a grommet through the opening securing the curtain panel to the bracket, and a pin associated with the vehicle-structure-secured means positioned to be passed through the grommet.

7. The combination curtain and restraint system of claim 6, including a slotted opening in each bracket, below the grommet, with the restraint strap passing through the slotted opening and looped over and stitched together.

8. A combination curtain and restraint system for a vehicle bunk, comprising:
   structural means associated with the vehicle for suspending the curtain and restraint system;
   a flexible, openable curtain panel suspended from its top and there secured to said structural means, the panel having an inside surface facing into the bunk;
   at least three generally vertically depending restraint straps, secured to said structural means and positioned adjacent to the inside surface of the curtain panel but hanging independently therefrom;
   means for removably connecting the curtain panel near its bottom, at said inside surface, to the restraint straps when the curtain panel is to be closed and secured; and
   fastening means for securing the lower ends of the two outer vertically depending restraint straps to structure connected to the vehicle;
   with at least one transverse strap connecting the generally vertical restraint straps together;
   whereby the lower end of the curtain panel is secured by connection of the restraint straps to the inside surface of the curtain panel near its bottom, and by securing of the fastening means at the lower ends of the straps, and whereby an occupant of the vehicle bunk can secure the restraint straps, with or without the curtain panel, from inside the bunk.

9. The combination curtain and restraint system of claim 8, further including a pair of storage straps depending from structure connected to the vehicle, adjacent to the inside surface of the curtain panel, with releasable fastening means at the ends of the storage straps and corresponding fastening means near the upper ends of the storage straps, for storing the curtain panel, with or without the restraint straps, in raised, rolled-up condition, said storage straps being positioned between vertically depending restraint straps, the lower ends of the storage straps being higher than the transverse strap, whereby the openable curtain panel can be conveniently rolled up and stored by the storage straps alone, without interference from the restraint straps.

10. A combination curtain and restraint system for a sleeping bunk in a truck cab, comprising:
   a pair of side curtain panels and an openable center curtain panel of flexible material, suspended from their tops in the cab;
   panel fastening means between each side panel and the adjacent edge of the openable center panel, along generally vertical lines;
   reinforcing means along the peripheral border of the panels, with means for releasably connecting the panels to the cab structure;
   a plurality of restraint straps extending vertically, positioned adjacent to the inside surface of the center curtain panel;
   strap securing means for connecting the restraint straps at their upper ends to the cab structure;
   strap fastening means for releasably connecting the restraint straps at their bottom ends to the cab structure when restraint is to be effected;
   means associated with the center curtain panel and the restraint straps for enabling closure and securing of the bottom edge of the curtain panel only when the restraint straps are secured, via said strap fastening means, and for enabling use of the restraint straps independently of the curtain panel.

11. The combination curtain and restraint system of claim 10, wherein the means associated with the center curtain panel and the restraint straps comprises loops on the inside surface of the center curtain panel for receipt of the lower restraint strap ends therethrough when desired, to close the bottom of the center curtain panel as the restraint straps are secured at the strap fastening means.

12. The combination curtain and restraint system of claim 10, wherein the strap securing means comprises a bracket secured to the top of each strap, with an opening in the bracket and a pin connected to upper cab structure and positioned to be slidably inserted through the bracket opening.

13. The combination curtain and restraint system of claim 12, including a grommet through the bracket opening and securing the openable curtain panel to the bracket at the top of each strap.

14. The combination curtain and restraint system of claim 10, wherein the reinforcing means comprises an overlapped portion at the peripheral edges of the panels, with hook and loop type fastener means for releasably connecting the side curtain panels and the top of the center curtain panel to the cab structure.

15. The combination curtain and restraint system of claim 10, further including support strap means depending from the top of the curtain and restraint combination for storing the center curtain panel, with the restraint straps, if desired, in raised rolled-up condition.

16. The combination curtain and restraint system of claim 10, further including transverse restraint straps extending between and secured to the vertically extending restraint straps, forming a restraint web adjacent to the center curtain panel.

* * * * *